(12) United States Patent
George

(10) Patent No.: US 9,149,153 B2
(45) Date of Patent: Oct. 6, 2015

(54) BARBECUE, APPARATUS, AND METHOD FOR IMPROVED TEMPERATURE DISTRIBUTION, HEAT RETENTION, AND FLARE-UP PREVENTION

(71) Applicant: Jonathan D. George, Kenaston (CA)

(72) Inventor: Jonathan D. George, Kenaston (CA)

(*) Notice: Subject to any disclaimer, the term of this patent is extended or adjusted under 35 U.S.C. 154(b) by 389 days.

(21) Appl. No.: 13/760,180

(22) Filed: Feb. 6, 2013

(65) Prior Publication Data

US 2014/0216436 A1    Aug. 7, 2014

(51) Int. Cl.
*A47J 37/07*    (2006.01)
*A47J 37/06*    (2006.01)

(52) U.S. Cl.
CPC .......... *A47J 37/0786* (2013.01); *A47J 37/0694* (2013.01); *A47J 37/0713* (2013.01)

(58) Field of Classification Search
CPC    A47J 37/0786; A47J 37/0713; A47J 37/0694
See application file for complete search history.

(56) References Cited

U.S. PATENT DOCUMENTS 4,683,867 A * 8/1987 Beatty .......................... 126/41 R
6,314,868 B1 * 11/2001 Christensen et al. ........... 99/340

* cited by examiner

*Primary Examiner* — Alfred Basichas
(74) *Attorney, Agent, or Firm* — Kyle R. Satterthwaite; Ryan W. Dupuis; Ade & Company Inc.

(57) ABSTRACT

Provided is a barbecue apparatus for preventing flare-ups and improving temperature distribution and heat retention when cooking on a barbecue. The apparatus comprises at least one plate that is movable between a first position lying atop a respective side of at least one burner tent and a second position withdrawn from the respective side of the at least one burner tent. Further provided are a barbecue comprising said apparatus and a method of preventing flare-ups and improving temperature distribution and heat retention when cooking on a barbecue by moving at least one plate between a first position lying atop a respective side of at least one burner tent and a second position withdrawn from the respective side of the at least one burner tent.

20 Claims, 5 Drawing Sheets

BARBECUE, APPARATUS, AND METHOD FOR IMPROVED TEMPERATURE DISTRIBUTION, HEAT RETENTION, AND FLARE-UP PREVENTION

FIELD

This disclosure relates to the field of barbecues, and more particularly to devices for preventing flare-ups and improving temperature distribution and heat retention when cooking on a barbecue. The disclosure further relates to methods of preventing flare-ups and improving temperature distribution and heat retention when cooking on a barbecue.

BACKGROUND

Three well known problems when cooking with a gas barbecue are: 1) flare ups while cooking; 2) uneven cooking temperature, also referred to as "hot spots" or "cold spots" in a gas barbeque; and 3) a rapid loss in cooking temperature when opening the barbecue lid to check on or turn food being cooked.

Previous solutions attempting to address the first one or two of the above issues often employ a mechanism for rotating the grill of a round barbecue so that the food on different areas of the grill remain in motion and are exposed to the different parts of the overall cooking area.

Another proposed solution has been to instead rotate the burner of a gas grill so that the source of flame moves around the cooking area to evenly distribute heat and avoid scorching by prolonged exposure of any given piece of food to a flare up of the flame.

Yet another proposal suggests supporting charcoal or wood in a rotating tray situated below the grill but elevated above the stationary bottom of the barbecue.

When cooking with skewers, another solution has been to provide a mechanism that holds multiple radially-oriented skewers at a central point over the barbecue grill and rotates to revolve the skewers around the grill.

However, it is clear that these 'rotational' solutions rely on mechanisms that are only suitable for barbecues of round circumference. Accordingly, there remains a need for solutions that address one or more of the above listed problems when cooking with a rectangular barbecue grill.

SUMMARY

Provided is a barbecue apparatus for preventing flare-ups and improving temperature distribution and heat retention when cooking on a barbecue. Further provided are a barbecue comprising said apparatus and a method of preventing flare-ups and improving temperature distribution and heat retention when cooking on a barbecue.

One embodiment is an apparatus for use with a barbecue firebox, the barbecue firebox comprising a bottom wall, peripheral walls projecting upward from the bottom wall around a perimeter thereof, at least one burner, and a burner tent suspended above the at least one burner so as to collect heat from the burner when the burner is in use; said apparatus comprising at least one plate pivotally suspended in the barbecue firebox, aligned parallel to the at least one burner tent; and a control mechanism operable to pivot the at least one plate between a first position lying atop a respective side of the at least one burner tent and a second position withdrawn from the respective side of the at least one burner tent.

In an embodiment, the apparatus comprises a plurality of plates pivotally suspended in the barbecue firebox.

In a further embodiment, the barbecue firebox comprises a plurality of burners and the apparatus comprises a pair of plates pivotally suspended between the burner tents covering each burner. In an additional embodiment, the plates included in each pair of plates are spaced apart from one another in a parallel alignment and are pivotally joined by a connector.

In an embodiment, the control mechanism is a manual control mechanism.

In an embodiment, the control mechanism comprises a movable rod. In a further embodiment, the rod is a U-shaped rod and each plate is pivotally suspended in the barbecue firebox through pivotal engagement with each arm of said rod.

In an embodiment, each plate is pivotally suspended in the barbecue firebox through pivotal engagement with said rod. In a further embodiment, two opposing peripheral walls of the barbecue firebox each comprise at least one aperture and the rod is supported by said opposing peripheral walls by passing through at least one of said apertures in each of said opposing peripheral walls.

In an embodiment, the rod comprises at least one notch on its underside that allows the rod to be stably maintained in a fixed position through engagement between said at least one notch and the edge of at least one peripheral wall aperture passed through by said rod. In an additional embodiment, the rod comprises at least two spaced apart notches on its underside, a first notch positioned to allow the rod to be stably maintained in a first position that aligns at least one plate in the first position lying atop a respective side of at least one burner tent and a second notch positioned to allow the rod to be stably maintained in a second position that aligns at least one plate in the second position withdrawn from the respective side of at least one burner tent.

In an embodiment, the number of plates is at least equal to the number of burner tent faces.

A further embodiment is a barbecue in combination with an apparatus of the disclosure.

Yet another embodiment is a method of improving heat distribution and preventing flare-ups when cooking with a barbecue, said barbecue comprising a barbecue firebox, said barbecue firebox comprising a bottom wall, peripheral walls projecting upward from the bottom wall around a perimeter thereof, at least one burner, and a burner tent suspended above the at least one burner so as to collect heat from the burner when the burner is in use; said method comprising moving at least one plate during the cooking process between a first position lying atop a respective side of the at least one burner tent and a second position within the barbecue box and withdrawn from the respective side of the at least one burner tent.

In a further embodiment of the method, the at least one plate is pivotally suspended in the barbecue firebox through engagement with a rod and the at least one plate is moved between the first and second positions by moving said rod.

A further embodiment is an apparatus for use with a barbecue firebox, the barbecue firebox comprising a bottom wall, peripheral walls projecting upward from the bottom wall around a perimeter thereof, at least one burner, and a burner tent suspended above the at least one burner so as to collect heat from the burner when the burner is in use; said apparatus comprising: at least one plate arranged to be pivotally suspended in the barbecue firebox in an alignment parallel to the at least one burner tent; and a control mechanism arranged to be operable in a manner pivoting the at least one plate between a first position lying atop a respective side of the at least one burner tent and a second position withdrawn from the respective side of the at least one burner tent when the plate is pivotally suspended in the barbecue firebox.

DESCRIPTION

Figure 1:
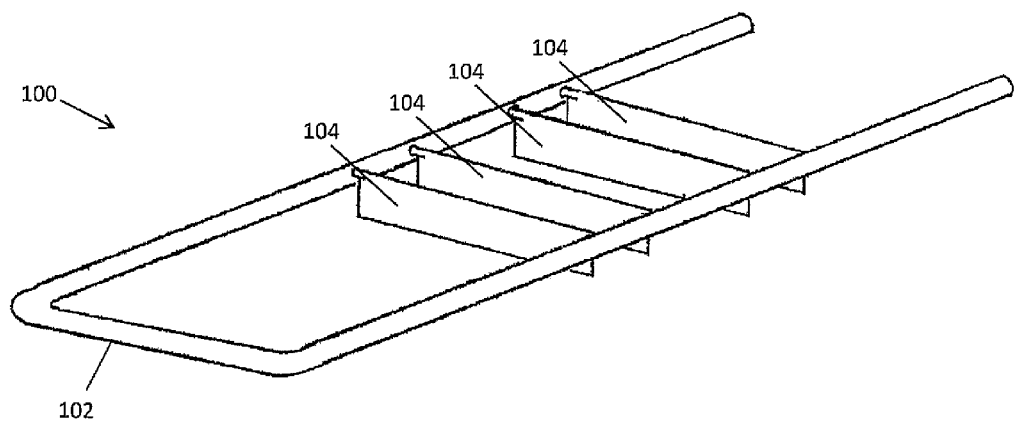
FIG. 1 depicts a perspective view of an apparatus of the disclosure.

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense. Further, where considered appropriate, reference numerals may be repeated among the figures to indicate corresponding or analogous elements.

The present disclosure provides generally an apparatus for preventing flare-ups and improving temperature distribution and heat retention when cooking on a barbecue. The apparatus comprises one or more plates that are movable between a first position lying atop a respective side of at least one burner tent (also referred to as a heat diffuser, heat shield, heat plate, burner cover, vaporizer bar, or flavorizer bar) and a second position withdrawn from the respective side of the at least one burner tent. When the plate is in the first position, it collects heat from the burner tent and shields the burner tent from food drippings and when in the second position the plate radiates the collected heat, thereby promoting even heating. The disclosure further provides a barbecue grill comprising an apparatus of the disclosure and provides a method of preventing flare-ups and improving temperature distribution and heat retention when cooking on a barbecue by moving a plate between a first position lying atop a respective side of at least one burner tent and a second position withdrawn from the respective side of the at least one burner tent.

Figure 2:
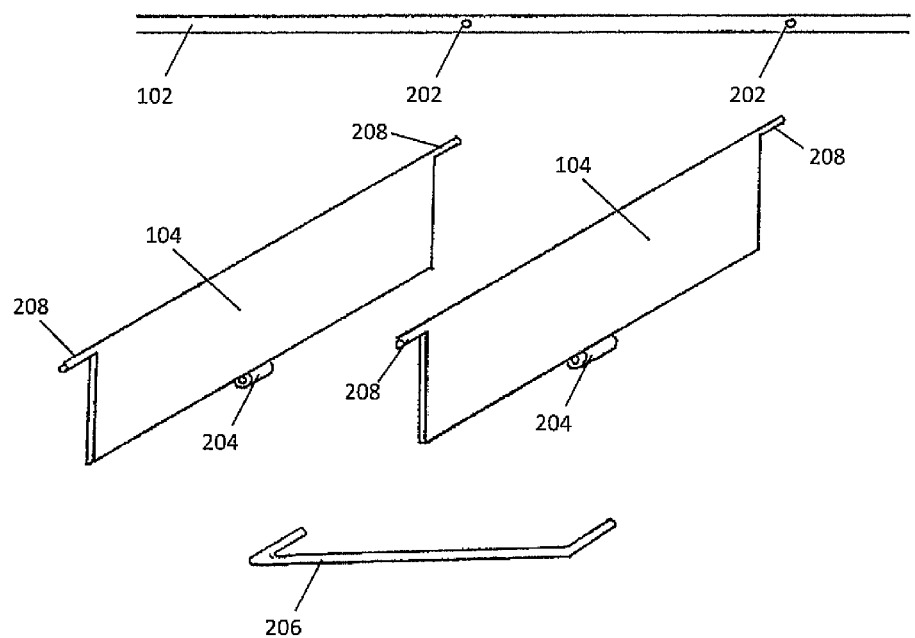
FIG. 2 depicts an exploded perspective view of a portion of the apparatus shown in FIG. 1.

One embodiment of an apparatus of the disclosure is depicted in FIG. 1. In this embodiment, the apparatus 100 comprises a U-shaped rod 102 and a plurality of plates 104 that are pivotally joined to rod 102. An exploded view of a section of apparatus 100 is depicted in FIG. 2. Rod 102 has comprises apertures 202 that are arranged to receive connector arms 208 that are joined to each plate 104. Each plate 104 further comprises, a female connector 204 that pivotally engages plate connector rod 206. Plate connector rod 206 joins a pair of adjacent plates 104 and maintains the plates 104 in a substantially parallel orientation relative to one another, preventing the joined plates 104 from swinging independently of one another.

Plates 104 should be made of a heat conductive material that can withstand repeated exposure to the heat generated by an active barbecue burner. In an embodiment, the apparatus employs metal plates, but it will be appreciated that the plates may be made from other suitable materials or composite materials as will be understood by a person skilled in the art. For example, suitable materials include but are not limited to metal, ceramic coated metal, and porcelain coated metal.

Figure 3:
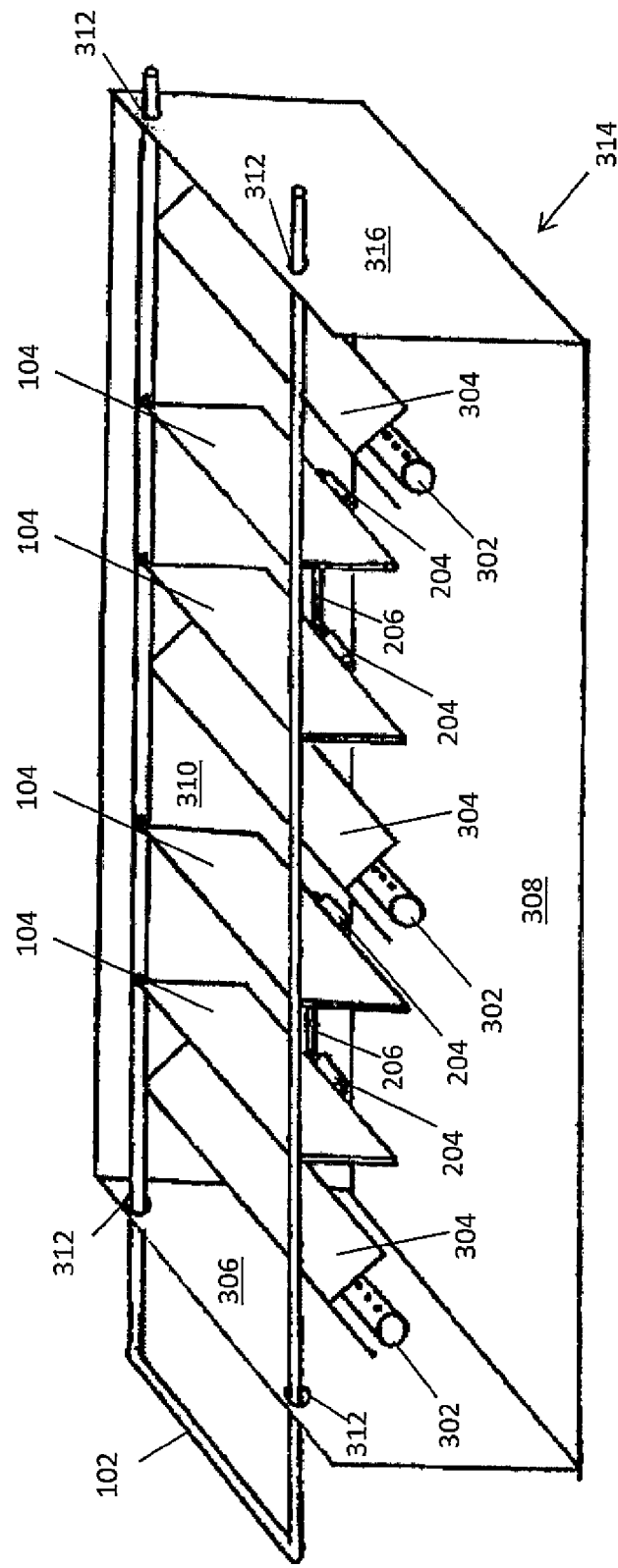
FIG. 3 depicts a perspective view of the apparatus shown in FIG. 1 positioned in a barbecue firebox, with the front wall of the barbecue firebox omitted to permit clearer depiction.
Figure 4:
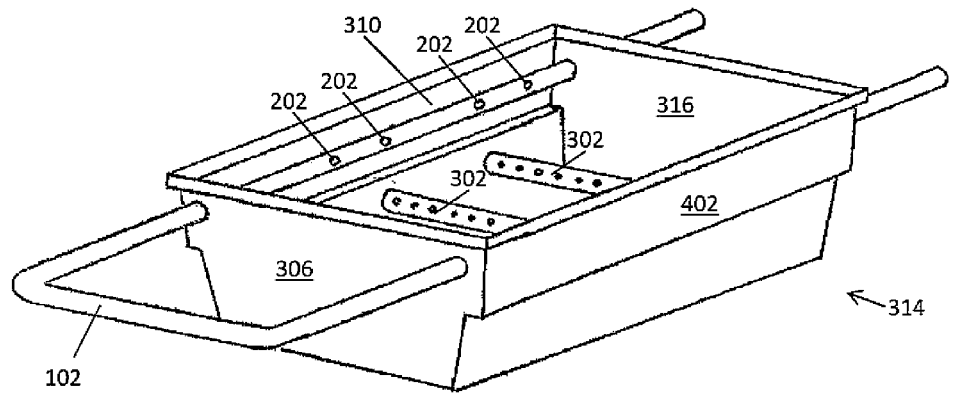
FIG. 4 depicts a perspective view of a barbecue firebox, with the rod portion of the apparatus shown in FIG. 1 positioned in the firebox.
Figure 5:
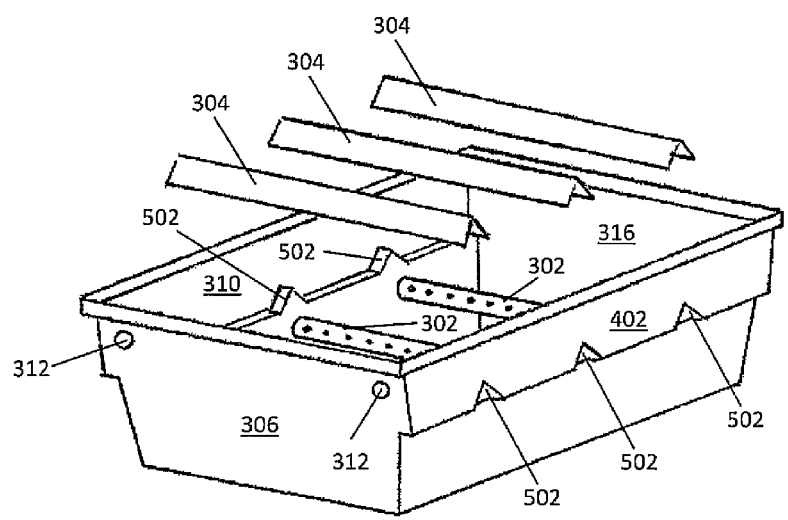
FIG. 5 depicts an exploded perspective view of a barbecue firebox comprising apertures arranged to receive an apparatus of the disclosure.

FIG. 3 depicts apparatus 100 positioned within a barbecue firebox 314. Barbecue firebox 314 comprises peripheral side walls 306, 310, 316, and 402 (side wall 402 is omitted from FIG. 3 in order to show inner details, but is depicted in FIGS. 4 and 5) and bottom wall 308. The barbecue firebox further includes burners 302, over each of which is suspended a burner tent 304. The illustrated burners are of a linear type, with their axial or lengthwise dimensions lying generally parallel to the side walls 306 and 316 of the barbecue box, and generally perpendicular to the other side walls 310 and 402. The burner tents are of a peaked configuration, each having two downwardly diverging halves sloping obliquely downward to a respective side of the burner from a peak aligned over the longitudinal axis of the respective burner.

In addition, the barbecue firebox 314 includes apertures 312 in each side wall 306 and 316. U-shaped rod 102 features two parallel arms running respectively along the side walls 310, 402 of the firebox at short distances inward therefrom, and at a height shortly below the barbecue grill (not shown). The two rod arms are perpendicularly joined together at one end by a central span of the rod at a location outside the firebox, past one of the side walls 306. The arms of the rod 102 pass through apertures 312, whereby the rod is movably supported by the side walls 306 and 316 of barbecue firebox 314 for sliding linearly back and forth in a direction parallel to side walls 310, 402. The central span of the U-shaped rod forms a handle outside the firebox for manual gripping of the rod for displacement back and forth inside the firebox. In another embodiment, a handle feature employing a heat-insulating material may be provided.

Turning back to FIG. 2, the plates 104 of the illustrated embodiment are of elongated rectangular form, each having a length substantially spanning that of the burner tents. The illustrated connector 204 is provided in the form of a short length of hollow cylindrical tubing, pipe or conduit fixed to the bottom lengthwise edge of the plate 104 to lie axially parallel thereto. Connector arms 208 project from opposite ends of the top lengthwise edge of the plate in a direction parallel thereto. The connector rod 206 is a smaller U-shaped rod, the parallel legs of which are respectively received in the cylindrical female connectors 204 of two neighbouring plates between a respective pair of burners.

Figure 9:
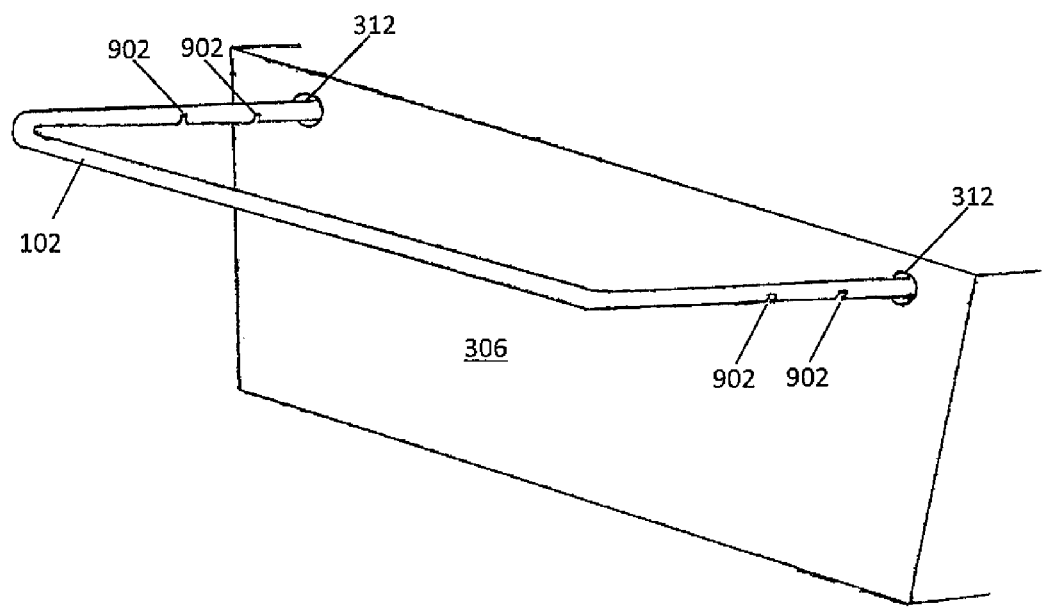
FIG. 9 depicts a partial view of a barbecue firebox, with the rod portion of the apparatus positioned in the firebox.

In an embodiment depicted in FIG. 9, rod 102 comprises one or more notches 902 that engage the edge of at least one aperture 312 and allow rod 102 to be stably maintained in a fixed position. In an embodiment, rod 102 comprises at least two spaced apart notches 902, a first notch aligned to allow the rod to be stably maintained in a first position that aligns at least one plate in the first position lying atop a respective side of at least one burner tent and a second notch positioned to allow the rod to be stably maintained in a second position that aligns at least one plate in the second position withdrawn from the respective side of at least one burner tent. As illustrated in FIG. 9, when rod 102 is a U-shaped rod, both arms of rod 102 may comprise notches 902, although in other embodiments a single arm of rod 102 may comprise at least one notch 902. It will be appreciated that other embodiments may employ different methods of securing the apparatus in the first and second position. In another embodiment the apparatus may have no feature to secure the apparatus in the first and second position.

In FIG. 4, rod 102 is shown supported in a barbecue firebox 314. The plates 104 and burner tents 304 have been omitted to permit a more detailed depiction of the rod 102 and burners 302. FIG. 5 shows an exploded view of barbecue firebox 314, detailing burner tent supports 502 that can be used to suspend the burner tents 304 over top of burners 302.

Figure 6:
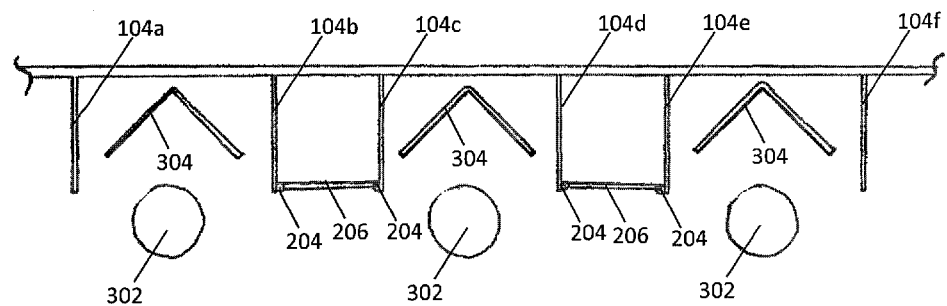
FIG. 6 depicts a side elevation view of an apparatus of the disclosure, suspended over three burner tents, in an intermediate position between a first position as depicted in FIG. 7 and a second position as depicted in FIG. 8.
Figure 7:
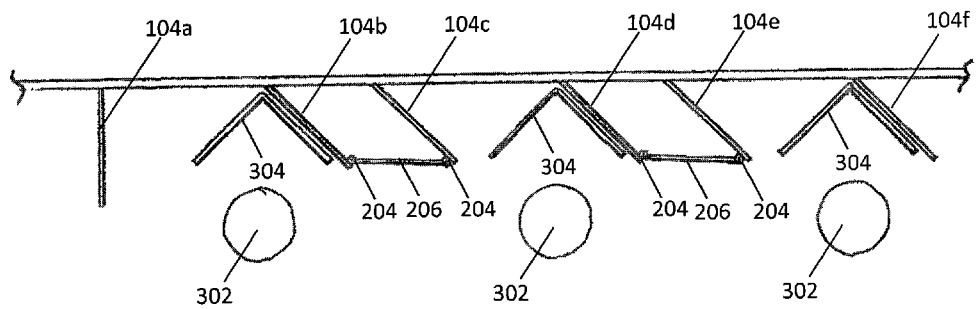
FIG. 7 depicts a side elevation view of an apparatus of the disclosure, suspended over three burner tents, in a first position.
Figure 8:
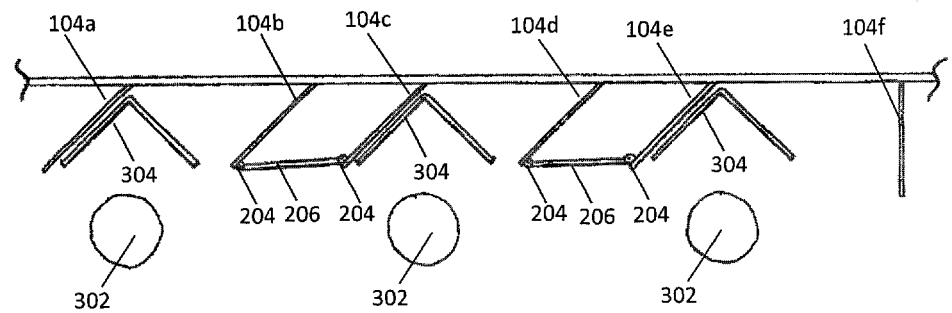
FIG. 8 depicts a side elevation view of an apparatus of the disclosure, suspended over three burner tents, in a second position.

FIGS. 6, 7, and 8 depict a side elevation view of an apparatus of the disclosure suspended over a series of burners 302 covered by burner tents 304. The apparatus is shown in a different position in each figure. In this embodiment, the apparatus has six plates 104*a* to 104*f* pivotally suspended within a barbecue burner box (not shown). Suspended between each pair of burners 302 is a pair of plates 104*b* and 104*c* or 104*d* and 104*e*. These burner plate pairs are joined by connector rods 206 that join the plates 104 through pivotal engagement with female connectors 204. These connector rods 206 maintain the joined pairs of plates 104*b* and 104*c* or 104*d* and 104*e* in a substantially parallel orientation relative to one another.

FIG. 6 shows the apparatus in an intermediate position withdrawn from the side of each burner tent 304. In this position, none of plates 104 is in contact with a burner tent 304, each plate instead hanging in a generally vertical orientation at a position laterally outward from the respective burner tent. The width dimension shared by the equally sized plates is sufficient so that each plate hangs far enough downward to place the lower edge of each plate at an elevation below the lowermost extent of each burner tent.

FIG. 7 shows the apparatus in a first position moved leftward from the intermediate position depicted in FIG. 6. During such movement, the rightmost plate 104*f* of the apparatus and the left plate 104*d*, 104*b* in each of the plate pairs linked by a respective connector 206 comes into contact with the lower edge of the right half of a respective burner tent, and under continued leftward movement of the rod, these plates each pivot about this edge of the respective burner tent until the plate is tilted into a seated position flush atop the top-right face of the respective burner tent. In this position the plates 104 in contact with a burner tent 304 collect heat from the burner tent when the burners 302 are in use. If the apparatus is moved from the position shown in FIG. 7 back to the position shown in FIG. 6 or to the second position shown in FIG. 8, then plates 104*b*, 104*d*, and 104*f* would radiate the heat collected from burner tents 304 and may contribute to even heat distribution and heat retention. When a plate 104 is in contact with a burner tent 304 it shields the burner tent 304 from food drippings, thereby reducing the quantity of food drippings that can accumulate on the burner tent and reducing the potential for flare-ups.

FIG. 8 shows the apparatus in a second position moved rightward from the intermediate position depicted in FIG. 6. In this position, some of plates 104; specifically 104*a*, 104*c*, and 104*e*; are lying atop a side of a burner tent 304. That is, sufficient rightward movement of the rod out of the position of FIG. 6 or 7 brings the leftmost plate 104*a* of the apparatus, and the right plate 104*c*, 104*e* in each of the plate pairs linked by a respective connector 206, into contact with the lower edge of the left half of a respective burner tent, and under continued rightward movement of the rod, these plates each pivot about this edge of the respective burner tent until the plate is tilted into a seated position flush atop the top-left face of the respective burner tent.

When the apparatus is in the first position, as depicted in FIG. 7, the right face of each of plates 104*b*, 104*c*, 104*d*, 104*e*, and 104*f* is exposed to drippings. When the apparatus is moved to the second position, as shown in FIG. 8, the left face of each of plates 104*a*, 104*b*, 104*c*, 104*d*, and 104*e* is exposed to drippings. Thus, when the apparatus is moved between the first position and the second position, the opposite faces of plates 104*b*, 104*c*, 104*d*, and 104*e* become exposed to drippings. During the time that a plate face is not exposed to drippings, any drippings previously collected on that plate face have an opportunity to burn off. Similarly, while one upper face of a burner tent 304 is shielded from drippings by a plate 104, the opposite upper face of the burner tent 304 is exposed to drippings. Movement of the apparatus between the first position and the second position, as shown in FIGS. 7 and 8 respectively, alternately exposes each upper face of each burner tent 304 to drippings. During the time that an upper face of a burner tent 304 is shielded from drippings by a plate 104, any drippings previously collected on that upper face have an opportunity to burn off.

In the embodiment depicted in FIGS. 6, 7, and 8 the number of plates 104 is equal to the number of burner tent 304 faces, with pairs of plates 104 positioned between each pair of burner tents 304. This arrangement permits a plate to lie atop each burner plate 304 face, by moving the apparatus between the three positions depicted in FIGS. 6, 7, and 8.

A pair of plates, as opposed to a single plate, between each pair of burners means that for any given time at which one of these plates is laid atop the respective burner tent, the other plate is disposed at an intermediate position between the tents of the two burners. Accordingly, while one plate is being heated up by the respective burner tent, the other plate is emitting heat previously collected from the tent of the other burner at an intermediate location between the two burners, thus improving heat distribution by giving off heat at an area between the two burners. Sufficient movement in one direction to place one of the two plates against the respective burner tent thus withdraws the other of the two plates from off the other burner tent.

Another embodiment is a method of improving heat distribution and preventing flare-ups when cooking with a barbecue firebox by moving at least one plate during the cooking process between a first position lying atop a respective side of at least one burner tent and a second position within the barbecue box and withdrawn from the respective side of the at least one burner tent. The method may improve heat distribution during the cooking process.

In an embodiment, the method is carried out so that the face of each burner tent 304 is covered by a plate 104 for at least a portion of the cooking time. This ensures that no face of any burner tent remains exposed to food drippings over the entire course of the cooking process, which may reduce or even eliminate flare-ups by reducing the quantity of food drippings that are able to accumulate on each burner face. That is, if each plate spends half of the overall cooking time on the burner tent, and half the overall cooking tent withdrawn from over the burner tent, then the burner tent is only half as exposed to potential drippings compared to use of the barbecue without the present invention. The apparatus increases the available surface area for distributing heat and catching drippings compared to use of the barbecue without the present invention. Furthermore, should a flare-up occur on an uncovered tent face, the apparatus can be used to then cover the tent face with the respective plate, thereby smothering out the flame on the burner tent.

A test carried out using an apparatus of the disclosure has shown that shifting the apparatus between the positions of FIGS. 7 and 8 every two to three minutes significantly reduced the incidence of flare-ups.

In an embodiment, the barbecue grill box may comprise a single burner or a plurality of burners 302, each covered by a burner tent 304. Depending on the design of the burner tent, each burner 302 may be covered by an individual burner tent 304 or each burner tent 304 may cover one or more burners. Further, the burners 302 may be linear burners, also known as rod burners, as depicted in FIGS. 3 to 8, or they may be of any other suitable burner shape which will be known to a person skilled in the art. In an embodiment, the apparatus is arranged to be used in a barbecue grill box where each burner has an individual burner tent.

Although the illustrated embodiment employs a rod-type support for the plates sliding back and forth in apertures of opposing walls of the barbecue firebox, other means slidable back and forth in the firebox to shift and swing the plates between positions may be employed. For example, another embodiment may feature inward-jutting ledges on walls 310, 402 at a height below where the grill is supported, and a pair of rails disposed on these ledges and slidable therealong. One or both of the rails may project through a respective aperture in one of walls 306, 312 to present a handle outward therefrom, similar to the illustrated embodiment. In yet another embodiment, a slot-shaped cutout may be made in wall 402 in order for a handle to jut out from the firebox through the slot, whereby sliding of the handle back and forth in the slot controls movement of the apparatus.

Further, while the illustrated embodiment is arranged such that the control mechanism is arranged to be operated manually, in other embodiments operation of the control mechanism may effected by a manually triggered or timer-controlled actuator. In an embodiment, operation of the control mechanism is controlled by an actuator that operates the control mechanism to move the at least one plate at an adjustable and/or predetermined frequency between a first position lying atop a respective side of the at least one burner tent and a second position withdrawn from the respective side of the at least one burner tent.

Numerous specific details are set forth herein in order to provide a thorough understanding of the exemplary embodiments described herein. However, it will be understood by those of ordinary skill in the art that these embodiments may be practiced without these specific details. In other instances, well-known methods, procedures and components have not been described in detail so as not to obscure the description of the embodiments.

Further, while the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting. It will be understood by persons skilled in the art that other variants and modifications may be made without departing from the scope of the invention as defined in the appended claims.

What is claimed is:

1. An apparatus for use with a barbecue firebox, the barbecue firebox comprising a bottom wall, peripheral walls projecting upward from the bottom wall around a perimeter thereof, at least one burner, and a burner tent suspended above the at least one burner so as to collect heat from the burner when the burner is in use; said apparatus comprising:
   at least one plate pivotally suspended in the barbecue firebox in a manner aligned parallel to the at least one burner tent and movable between a first position lying flush atop, and covering a substantial majority of, a respective side of the at least one burner tent in direct physical contact therewith to collect heat therefrom and block drippings from accumulating thereon, and a second position withdrawn from the respective side of the at least one burner tent to emit the collected heat from the at least one pivotal plate at a position laterally outward therefrom; and
   a control mechanism operable to pivot the at least one plate between the first position and the second position to alternate the at least one plate between a heat collecting and drip blocking state preventing flare-ups, and a heat emitting state improving heat distribution throughout the barbecue firebox.

2. The apparatus of claim 1, comprising two plates pivotally suspended in the barbecue firebox, and wherein the control mechanism is arranged to automatically move one of the two plates from the first position to the second position during movement of the other of the two plates from the second position to the first position.

3. The apparatus of claim 2, wherein the barbecue firebox comprises two burners covered by two respective burner tents, the apparatus comprises two plates pivotally suspended between the two burner tents and each movable between the first and second positions in relation to a respective one of the two burner tents, wherein the control mechanism is arranged to automatically move one of the two plates from the first position to the second position during movement of the other of the two plates from the second position to the first position.

4. The apparatus of claim 3, wherein the two are spaced apart from one another in a parallel alignment and are joined together by a connector that is pivotally coupled to each of said two plates.

5. The apparatus of claim 1, wherein the control mechanism is a manual control mechanism.

6. The apparatus of claim 1, wherein the control mechanism comprises a movable rod.

7. The apparatus of claim 6, wherein each plate is pivotally suspended in the barbecue firebox through pivotal engagement with said rod.

8. The apparatus of claim 7, wherein two opposing peripheral walls of the barbecue firebox each comprise at least one aperture and the rod is supported by said opposing peripheral walls by passing through at least one of said apertures in each of said opposing peripheral walls.

9. The apparatus of claim 8, wherein the rod comprises at least one notch on its underside that allows the rod to be stably maintained in a fixed position through engagement between said at least one notch and the edge of at least one peripheral wall aperture passed through by said rod.

10. The apparatus of claim 9, wherein the rod comprises at least two spaced apart notches on its underside, a first notch positioned to allow the rod to be stably maintained in a first position that aligns at least one plate in the first position lying atop a respective side of at least one burner tent and a second notch positioned to allow the rod to be stably maintained in a second position that aligns at least one plate in the second position withdrawn from the respective side of at least one burner tent.

11. The apparatus of claim 7, wherein the rod is a U-shaped rod and each plate is pivotally suspended in the barbecue firebox through pivotal engagement with each arm of said rod.

12. The apparatus of claim 1, wherein the number of plates is equal to the number of burner tent faces.

13. The apparatus of claim 1, in combination with a barbecue.

14. The apparatus of claim 1 wherein the at least one plate comprises a plurality of plates arranged in one or more cooperating pairs, and the control mechanism is arranged to simultaneously pivot the plates in each cooperating pair in a same common direction.

15. A method of improving heat distribution and preventing flare-ups when cooking with a barbecue, said barbecue comprising a barbecue firebox, said barbecue firebox comprising a bottom wall, peripheral walls projecting upward from the bottom wall around a perimeter thereof, at least one burner, and a burner tent suspended above the at least one burner so as to collect heat from the burner when the burner is in use; said method comprising moving at least one plate during the cooking process between a first position lying flush atop, and covering a substantial majority of, a respective side of the at least one burner tent in direct physical contact therewith to collect heat therefrom and block drippings from accumulating thereon, and a second position withdrawn from the respective side of the at least one burner tent to emit the collected heat from the at least one pivotal plate at a position laterally outward therefrom, whereby movement of the at least one plate between the first and second positions alternates the at least one plate between a heat collecting and drip blocking state preventing flare-ups, and a heat emitting state improving heat distribution throughout the barbecue firebox.

16. The method of claim 15, wherein the at least one plate comprises a plurality of plates pivotally suspended in the barbecue firebox through engagement of said plurality of plates with a rod, and the plurality of plates are moved between the first and second positions by moving said rod.

17. The method of claim 15 wherein the at least one plate comprises two plates, and the method comprises simultaneously moving a one of said two plates from the first position to the second position while moving the other of said two plates from the second position to the first position.

18. The method of claim 15 wherein the barbecue firebox comprises two burners covered by two respective burner tents and two plates are pivotally suspended between the two burner tents, and the method comprises automatically and simultaneously moving one of the two plates from the first position to the second position during movement of the other of the two plates from the second position to the first position.

19. An apparatus for use with a barbecue firebox, the barbecue firebox comprising a bottom wall, peripheral walls projecting upward from the bottom wall around a perimeter thereof, at least one burner, and a burner tent suspended above the at least one burner so as to collect heat from the burner when the burner is in use; said apparatus comprising:

at least one plate arranged to be pivotally suspended in the barbecue firebox in an alignment parallel to the at least one burner tent in a manner movable a first position lying flush atop, and covering a substantial majority of, a respective side of the at least one burner tent in direct physical contact therewith to collect heat therefrom and block drippings from accumulating thereon, and a second position withdrawn from the respective side of the at least one burner tent to emit the collected heat from the at least one pivotal plate at a position laterally outward therefrom; and a control mechanism arranged to be operable in a manner pivoting the at least one plate between the first position and the second position to alternate the at least one plate between a heat collecting and drip blocking state preventing flare-ups, and a heat emitting state improving heat distribution throughout the barbecue firebox.

20. The apparatus of claim 19 wherein the at least one plate comprises a plurality of plates arranged in one or more cooperating pairs, and the control mechanism is arranged to simultaneously pivot the plates in each cooperating pair in a same common direction.

* * * * *